(12) United States Patent
Aschauer et al.

(10) Patent No.: US 11,424,933 B2
(45) Date of Patent: Aug. 23, 2022

(54) METHOD AND APPARATUS FOR EXCHANGING MESSAGES

(71) Applicant: Siemens Aktiengesellschaft, Munich (DE)

(72) Inventors: Hans Aschauer, Munich (DE); Steffen Fries, Baldham (DE)

(73) Assignee: SIEMENS AKTIENGESELLSCHAFT

(*) Notice: Subject to any disclaimer, the term of this patent is extended or adjusted under 35 U.S.C. 154(b) by 223 days.

(21) Appl. No.: 16/613,849

(22) PCT Filed: May 17, 2018

(86) PCT No.: PCT/EP2018/062916
§ 371 (c)(1),
(2) Date: Nov. 15, 2019

(87) PCT Pub. No.: WO2018/224280
PCT Pub. Date: Dec. 13, 2018

(65) Prior Publication Data
US 2020/0169413 A1    May 28, 2020

(30) Foreign Application Priority Data

Jun. 9, 2017 (EP) .................................. 17175275

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0643* (2013.01); *H04L 9/0819* (2013.01); *H04L 63/123* (2013.01); *H04L 69/326* (2013.01)

(58) Field of Classification Search
CPC ... H04L 9/3247; H04L 9/0643; H04L 9/0819; H04L 63/123; H04L 69/326
See application file for complete search history.

(56) References Cited

U.S. PATENT DOCUMENTS 5,526,267 A * 6/1996 Sogawa ............. G05B 23/0291
                                                   123/690
8,300,811 B2   10/2012 Georgiades et al.
(Continued)

FOREIGN PATENT DOCUMENTS

DE   102014106727 A1 * 11/2015 ........... H04L 9/0844
EP       2023573 A2    2/2009
(Continued)

OTHER PUBLICATIONS

Anonymous: "Hash-based message authentication code—Wikipedia", XP055428248, Gefunden im Internet: URL:https://en.wikipedia.org/w/index.php?title=Hash-based message authentication code&oldid=774442289 [gefunden am Nov. 23, 2017] * Abstract; Figure 1; 2017.

(Continued)

*Primary Examiner* — John B King
(74) *Attorney, Agent, or Firm* — Schmeiser, Olsen & Watts LLP

(57) ABSTRACT

A method and to an apparatus for achieving cryptographic protection of a plurality of messages in a message exchange, for example, in particular the cryptographic protection being implemented by means of digital signatures and nonces is provided. The nonces are not transmitted directly, but rather can be reproducibly calculated from preceding messages, wherein a checksum of a previous message is also considered for each nonce. Consideration is implemented in such a way that cryptographical calculations in particular intended for the creation of the digital signature and the (Continued)

nonce may be calculated one single time and not separately for the nonce and the digital signature.

14 Claims, 2 Drawing Sheets

(51) Int. Cl.
*H04L 9/06* (2006.01)
*H04L 9/08* (2006.01)
*H04L 9/40* (2022.01)
*H04L 69/326* (2022.01)

(56) References Cited

U.S. PATENT DOCUMENTS

| | | | |
|---|---|---|---|
| 8,531,247 B2 | 9/2013 | Dichtl | |
| 8,843,761 B2 | 9/2014 | Meyer et al. | |
| 8,892,616 B2 | 11/2014 | Dichtl | |
| 9,147,088 B2 | 9/2015 | Falk et al. | |
| 10,803,680 B2* | 10/2020 | Mrowczynski | H04L 67/12 |
| 2003/0182320 A1* | 9/2003 | Lai | G06F 8/71 |
| 2005/0193201 A1* | 9/2005 | Rahman | G06F 21/445 |
| | | | 713/169 |
| 2010/0088517 A1* | 4/2010 | Piersol | H04L 9/3236 |
| | | | 713/171 |
| 2013/0125114 A1 | 5/2013 | Frascadore | |
| 2013/0156180 A1 | 6/2013 | Hess | |
| 2015/0264080 A1 | 9/2015 | BuBer | |
| 2015/0341343 A1 | 11/2015 | Dichtl et al. | |
| 2016/0057237 A1* | 2/2016 | Yang | H04L 67/16 |
| | | | 709/224 |
| 2016/0218879 A1* | 7/2016 | Ferrin | G09C 1/00 |
| 2017/0163618 A1 | 6/2017 | Peddada | |
| 2020/0278963 A1* | 9/2020 | Destefanis | G06F 16/2465 |

FOREIGN PATENT DOCUMENTS

| | | |
|---|---|---|
| EP | 2605445 A1 | 6/2013 |
| EP | 2870565 A1 | 5/2015 |
| EP | 2891102 A1 | 7/2015 |
| JP | 2015082804 A * | 4/2015 |

OTHER PUBLICATIONS

PCT International Search Report dated Jul. 3, 2018 and corresponding to PCT International Application No. PCT/EP2018/062916 filed on May 17, 2018.

* cited by examiner

METHOD AND APPARATUS FOR EXCHANGING MESSAGES

CROSS-REFERENCE TO RELATED APPLICATIONS

This application claims priority to PCT Application No. PCT/EP2018/062916, having a filing date of May 17, 2018, which is based on European Application No. 17175275.1, having a filing date of Jun. 9, 2017, the entire contents both of which are hereby incorporated by reference.

FIELD OF TECHNOLOGY

The following relates to a method and to a device for the computer-assisted exchanging of messages.

BACKGROUND

Security protocols such as TLS and others, while negotiating a session key, use random numbers to increase the entropy in the actual key negotiation. Furthermore, this allows both communication partners to contribute to the key negotiation, in particular in the case of using a connection that is authenticated on one side, in which the client sends the server information in a manner encrypted by the public key of the server.

The known art discloses document U.S. Pat. No. 8,531,247 B2, document U.S. Pat. No. 8,892,616 B2, document U.S. Pat. No. 8,300,811 B2, document U.S. Pat. No. 9,147,088 B2, document EP 2 605 445 B1, document EP 2 870 565 A1, document EP 2 891 102 A1 and document U.S. Pat. No. 8,843,761 B2.

SUMMARY

An aspect relates to a method and a device for the computer-assisted exchanging of cryptographically protected messages.

According to a first aspect, embodiments of the invention relates to a method for exchanging messages, having the following method steps:
a) reception of a first message containing a first digital signature of a first communication partner by a second communication partner;
b) checking of the first digital signature by the second communication partner, wherein a first checksum is calculated for the first message in order to check the first digital signature;
c) provision of a second checksum for a second message by the second communication partner, wherein
    the second message is divided into second message parts,
    a second sub-checksum is formed by way of the second message parts up to a last message part of the second message parts,
    the second checksum is formed on the basis of the second sub-checksum and taking into consideration the last message part;
d) formation of a second digital signature for the second message on the basis of the second checksum by the second communication partner;
e) calculation of a second nonce on the basis of the second sub-checksum and taking into consideration the last message part by the second communication partner, wherein the first checksum is attached to the last message part for this calculation;
f) transmission of the second message containing the second digital signature to the first communication partner by the second communication partner.

Unless stated otherwise in the following description, the terms "perform", "calculate", "computer-assisted", "compute", "establish", "generate", "configure", "reconstruct" and the like may refer to actions and/or processes and/or processing steps that change and/or generate data and/or convert the data into other data, wherein the data may in particular be depicted or be present in the form of physical variables, for example in the form of electrical pulses. The expression "computer" should in particular be interpreted as broadly as possible in order in particular to cover all electronic devices having data processing properties. Computers may thus be for example personal computers, servers, programmable logic controllers (PLCs), hand-held computer systems, pocket PC devices, mobile radio devices and other communication devices that are able to process data in a computer-assisted manner, processors and other electronic data processing devices.

"Computer-assisted" in connection with embodiments of the invention may be understood to mean for example an implementation of the method in which in particular a processor executes at least one method step of the method.

A "processor" in connection with embodiments of the invention may be understood to mean for example a machine or an electronic circuit. A processor may be in particular a main processor (central processing unit, CPU), a microprocessor or a microcontroller, for example an application-specific integrated circuit or a digital signal processor, possibly in combination with a storage unit for storing program commands, etc. A processor may also be for example an IC (integrated circuit), in particular an FPGA (field-programmable gate array) or an ASIC (application-specific integrated circuit), or a DSP (digital signal processor) or a graphic processor GPU (graphic processing unit). A processor may also be understood to mean a virtualized processor, a virtual machine or a soft CPU. It may also be for example a programmable processor that is equipped with configuration steps so as to execute said method according to embodiments of the invention or is configured by way of configuration steps such that the programmable processor implements the inventive features of the method, the component, the modules, or other aspects and/or partial aspects of embodiments of the invention.

A "storage unit" or a "storage module" and the like in connection with embodiments of the invention may be understood to mean for example a volatile memory in the form of working memory (random-access memory, RAM) or a permanent memory such as a hard disk or a data carrier.

A "checksum" in connection with embodiments of the invention may be understood to mean for example a cryptographic checksum or a cryptographic hash or a hash that are formed or calculated by way of messages or message parts, in particular by way of a hash function or a cryptographic hash function. It may furthermore also be understood to mean in particular a cryptographic message authentication code.

A "nonce" in connection with embodiments of the invention may be understood to mean for example a cryptographic nonce (abbreviation for: "used only once" "number used once") that is in particular used just once in the respective context.

The method is advantageous in order for example to achieve cryptographic protection of a plurality of messages in a message exchange, wherein the cryptographic protection is in particular achieved by way of digital signatures and nonces. In this case, the nonces are not transmitted directly, but rather may in particular be calculated in a reproducible manner from preceding messages, wherein a checksum of a previous message is jointly taken into consideration for the respective nonce itself. This joint consideration is implemented such that particular cryptographic calculations may be calculated just once in particular in order to create the respective digital signature and the nonce, and in particular not completely separately for the respective nonce and the respective digital signature. The method is in this case advantageous in particular in the context of a key negotiation between communication partners. This is advantageous in particular since, in the case of embedded systems, less effort is required to calculate the digital signature of the key negotiation messages. The effort in terms of the hash operation in the case of the actual digital signature is advantageously thereby able to be ignored. Furthermore, the required bandwidth for the messages is instead reduced in particular in the case of the message exchange (for example in the case of the key negotiation), since the nonces in particular do not have to be sent jointly. Incorporating the previous message into the calculation of the current nonce furthermore in particular achieves chaining of the messages in the corresponding order.

In a first embodiment of the method, prior to the reception in method step a), the following method steps are executed by the first communication partner:

aa) calculating the first checksum for the first message, wherein
the first message is divided into first message parts,
a first sub-checksum is formed by way of the first message parts up to a last message part of the first message parts,
the first checksum is formed on the basis of the first sub-checksum and taking into consideration a last message part of the first message parts;

ab) forming the first digital signature for the first message on the basis of the first checksum;

ac) calculating a first nonce on the basis of the first sub-checksum and taking into consideration the last message part, wherein
an initialization value is attached to the last message part of the first message for this calculation;

ad) transmitting the first message containing the first digital signature to the second communication partner.

The method is advantageous in order in particular to easily calculate a nonce for the first message without sending this jointly with the message. An initialization value may for example be attached when the method is initialized in step ac) during the calculation, so that the probability of multiple use of the nonce is minimized for the first nonce. The initialization value may have the same length as the first checksum, for example 256 bits.

In a further embodiment, a fixed message part length is predefined for the message parts, and the last message parts each give a remaining message part length that is less than or equal to the message part length.

The method is advantageous in order in particular to calculate the corresponding checksums more easily. To calculate a checksum, a message M of length m is in particular split into message parts (or also called partial messages) of length l. In order for example to be able to calculate the checksum for messages of any desired length, the message is filled in particular by what is called padding, such that the result is a message M' whose length m' is a multiple of l. If the padding has for example a minimum length p>0, in the event that the padding no longer fits into the last block (also called message part) (that is to say if m modulo l>l−p), a further partial message that consists only of padding is attached.

By way of example, a number d of message parts for a message of length m and a message part length l may be calculated as follows: d=m/l, wherein the remaining message part length e is given by e=m modulo l.

In a further embodiment of the method, the message part length is an integer multiple of 64 bits, and the message part length is in particular 256 bits or 512 bits long.

In a further embodiment of the method, key material for a cryptographic method is exchanged between the communication partners by way of the messages, or the result enters into a key derivation.

The method is advantageous in order in particular to establish the key material between the communication partners with as few cryptographic hash operations as possible.

It would in particular also be possible to use public key encryption with the messages and encrypt the key or, as an alternative, to use a signed Diffie Hellman method.

In a further embodiment of the method, the first checksum and/or the second checksum is a cryptographic hash.

In a further embodiment of the method, the first checksum and/or the second checksum are calculated by way of a cryptographic hash function.

In a further embodiment of the method, respective further digital signatures and further nonces are calculated by the first communication partner and/or the second communication partner in line with method steps a)-e) for further messages, and the further messages, containing their respective further digital signatures, are transmitted to the corresponding communication partner. In this case, further sub-checksums are in particular calculated in each case, and the checksum of the previous message is in particular taken into consideration in the calculation of the respective further nonce.

The method is advantageous in particular in order to cryptographically protect a plurality of messages and to make a man-in-the-middle attack more difficult.

According to a further aspect, embodiments of the invention relates to a device for transmitting a message comprising:

a first communication module for receiving a first message containing the first digital signature;

a first checking module for checking the first digital signature, wherein a first checksum is calculated in order to check the first digital signature;

a first provision module for providing a second checksum for a second message, wherein
the second message is divided into second message parts,
a second sub-checksum is formed by way of the second message parts up to a last message part of the second message parts,
the second checksum is formed on the basis of the second sub-checksum and taking into consideration the last message part;

a first calculation module for forming a second digital signature for the second message on the basis of the second checksum;

a second calculation module for calculating a second nonce on the basis of the second sub-checksum and taking into consideration the last message part, wherein
the first checksum is attached to the last message part for this calculation, the first communication module transmits the second message.

In a further embodiment of the device, the device comprises at least one further module or a plurality of further modules for performing the method according to embodiments of the invention (or one of its embodiments).

What is also disclosed is a computer program product (non-transitory computer readable storage medium having instructions, which when executed by a processor, perform actions) containing program commands for performing said methods according to embodiments of the invention, wherein in each case one of the methods according to embodiments of the invention, all of the methods according to embodiments of the invention or a combination of the methods according to embodiments of the invention is/are able to be performed by way of the computer program product.

What is additionally disclosed is a variant of the computer program product containing program commands for configuring a creation device, for example a 3D printer, a computer system or a production machine suitable for creating processors and/or devices, wherein the creation device is configured, by way of the program commands, such that said device according to embodiments of the invention is created.

What is furthermore disclosed is a provision device for storing and/or providing the computer program product. The provision device is for example a data carrier that stores and/or provides the computer program product. As an alternative and/or in addition, the provision device is for example a network service, a computer system, a server system, in particular a distributed computer system, a cloud-based computer system and/or virtual computer system that stores and/or provides the computer program product in the form of a data stream.

This provision takes place for example as a download in the form of a program data block and/or command data block, such as a file, in particular as a download file, or as a data stream, in particular as a download data stream, of the complete computer program product. This provision may also however take place for example as a partial download that consists of several parts and is downloaded in particular via a peer-to-peer network or is provided as a data stream. Such a computer program product is read into a system for example using the provision device in the form of the data carrier and executes the program commands such that the method according to embodiments of the invention is executed on a computer or configures the creation device such that the device according to embodiments of the invention is created.

BRIEF DESCRIPTION

Some of the embodiments will be described in detail, with reference to the following figures, wherein like designations denote like members, wherein.

DETAILED DESCRIPTION

Unless indicated otherwise or already indicated, the following exemplary embodiments have at least one processor and/or one storage unit in order to implement or execute the method.

A (relevant) person skilled in the art with knowledge of the method claim/method claims is also in particular obviously aware of all of the conventional options in the known art for producing products or implementation options, as a result of which there is no need in particular for an independent disclosure in the description. These customary implementation variants known to a person skilled in the art may in particular be implemented solely by way of hardware (components) or solely by way of software (components). As an alternative and/or in addition, a person skilled in the art, within the framework of his expert knowledge, may select an extensive number of any desired inventive combinations of hardware (components) and software (components) in order to implement implementation variants according to embodiments of the invention.

An inventive combination of hardware (components) and software (components) may in particular be involved if one portion of the inventive effects is brought about solely by special hardware (for example a processor in the form of an ASIC or FPGA) and/or another portion is brought about by the (processor-assisted and/or memory-assisted) software.

In light of the high number of different implementation options, it is in particular impossible and also not expedient or necessary for the understanding of embodiments of the invention to cite all of these implementation options. In this regard, all of the following exemplary embodiments are intended in particular to indicate, merely as an example, a few ways of how such implementations of the teaching according to embodiments of the invention could in particular appear.

The features of the individual exemplary embodiments are therefore not restricted in particular to the respective exemplary embodiment, but rather relate in particular to embodiments of the invention in general. Accordingly, features of one exemplary embodiment may also serve as features for another exemplary embodiment, in particular without this having to be cited explicitly in the respective exemplary embodiment.

Figure 1:
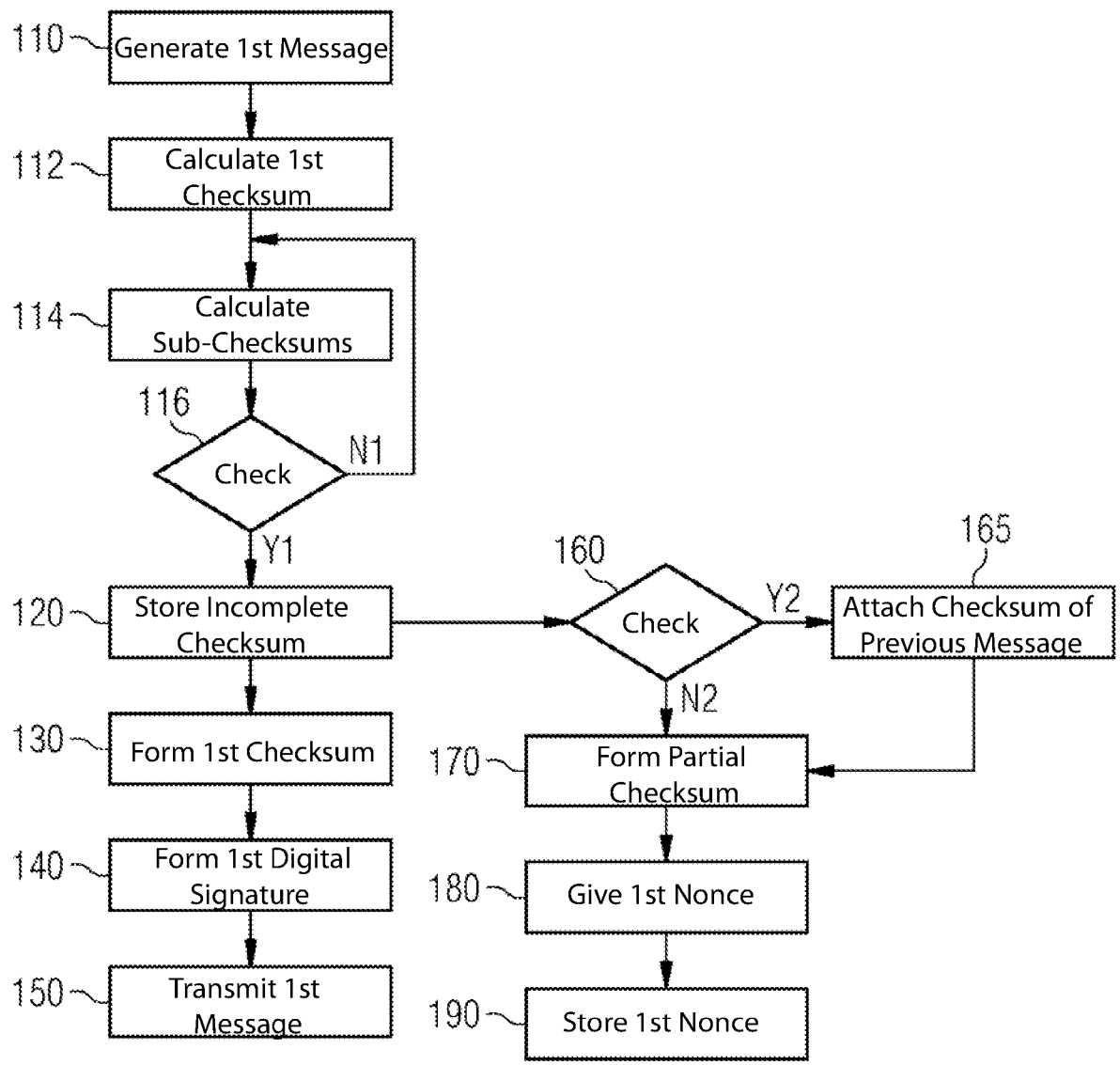
FIG. 1 shows a first exemplary embodiment of the invention in the form of a flowchart.

FIG. 1 shows a first exemplary embodiment of the invention in the form of a flowchart of the method according to embodiments of the invention for exchanging messages. The method may be performed in a computer-assisted manner, wherein the messages are in particular cryptographically protected by the method. The method may be performed for example by a first communication partner and a second communication partner in order for example to exchange cryptographic key material for cryptographically protected communication with one another.

The method comprises a method step 110 in which a first message for a key exchange is generated by a first communication partner. This is similar to the known method, such as the Diffie Hellman key exchange method.

The method comprises a method step 112 for the calculation of the first checksum for a first message by the first communication partner, wherein the first message is divided into first message parts. A fixed message part length, for example 512 bits, is in this case it may be predefined for the message parts.

In practice, a message M of length m may be split into partial messages of length l in order to calculate a checksum. In order to be able to calculate the checksum for messages of any length, the message is generally filled by what is known as padding, such that the result is a message M' whose length m' is a multiple of l. If the padding has a minimum length p>0, in the event that the padding no longer fits into the last block (that is to say if m modulo l>l−p), a further padding message part that consists only of padding is attached.

By way of example, a number d of message parts for a message (or else original message) M of length m and a fixed message part length l may be calculated as follows: d=m/l, wherein a remaining message part length e is given by e=m modulo l.

For the sake of completeness, it is now briefly explained how a number of message parts results for a message (for example message M') containing padding (bits) (that is to say a number of message parts that result from the padding) is able to be calculated as follows $$d_g = m/l + g$$

wherein g=0 or g=1 depending on whether an additional message part is required for the padding; g=0 means that no additional padding partial message that consists only of padding bits is required and g=1 means that an additional padding partial message is required. This is however of subordinate importance for the concept of embodiments of the invention, since these are in particular conventional padding methods that are known to a person skilled in the art.

The corresponding first (or second or further) message parts may then be numbered consecutively from 0 to d (if for example d is rounded down) or indexed, wherein d is the last message part of the (first) message parts and 0 is the first message part of the (first) message parts. In another implementation variant, counting may also be performed differently; if for example d is rounded up, the consecutive numbering may also be started at 1. Numbering from 0 to d is however assumed below.

Next, a first sub-checksum is formed by way of the first message parts up to a last message part d of the first message parts. In other words, the first sub-checksum is formed by way of the first message parts 0 to d−1. This is performed for example by calculation of the sub-checksums consecutively for the corresponding message parts, that is to say in each case by way of the message part 0 to message part d−1, by the first communication partner in a method step 114. In this case, it is in each case checked in a method step 116 whether the penultimate message part d−1 has been reached. If the penultimate message part d−1 has not yet been reached (path N1), the corresponding sub-checksum is formed for the corresponding message part.

Reference is made below to OpenSSL for one possible implementation of the method in this exemplary embodiment. Some of the explicitly explained method steps or features are in this case implicitly performed by OpenSSL. These are for example the padding or the division of the message into partial messages. Citing these serves only for better understanding of the method.

A cryptographic hash function, such as for example SHA256 that is available through the library OpenSSL, may for example be used to calculate these partial checksums. In detail, the cryptographic hash function is first of all initialized, for example by calling SHA256_Init(CTX, . . . ), wherein CTX are context data for the SHA algorithm. The respective partial checksums are then calculated for the corresponding message parts. This may for example be carried out by calling SHA256_Update(CTX, message part, . . . ) for the respective corresponding message part.

The SHA_Update function in this case works as follows. It buffer-stores all of the data that do not yet give a full message part (that is to say their length does not correspond to the fixed message part length), in order to take them into consideration at the next SHA_Update or at the SHA_Final call. These data are in particular stored in the context data.

If the penultimate message part is reached (path Y1), then the still incomplete checksum for the first message is buffer-stored as the first sub-checksum, wherein first sub-checksum means that until now in particular only the partial checksums have been calculated for the first message parts 0 to d−1.

This takes place for example by virtue of the fact that the context data CTX of the OpenSSL implementation of SHA-256 are copied by the first communication partner in a method step 120, wherein the copied context data are also referred to as CTX_K. At this time, there are thus two stored data structures CTX and CTX_K that each form part of the corresponding sub-checksum.

A sub-checksum may in this case for example comprise the context information (also context or context data) or else for example correspond thereto in one specific implementation, if the partial checksum has been calculated for the penultimate message part d−1. Following the calculation of the partial checksum for the penultimate message part d−1, the context information CTX for the SHA implementation of OpenSSL thus corresponds for example to the sub-checksum or forms at least part of the respective sub-checksum (for example first/second sub-checksum).

When calculating the partial checksums, in one variant, the preceding partial checksum (if present) of a respective message part may in particular be jointly taken into consideration, for example for the respective partial checksum.

The first checksum is then formed by the first communication partner in a method step 130 on the basis of the first sub-checksum and taking into consideration a last message part of the first message parts. For this purpose, the last message part d is then for example initially filled to the last message part length by way of padding if the remaining message part length e is not equal to 0. The corresponding checksum (for example first or second checksum) is then calculated for example by taking into consideration a partial checksum of the last message part depending on the partial checksum of the preceding message part (message part d−1). This is performed for example by the function SHA256_Final(CTX . . . ) calculating the (first) checksum.

In other words, the entire first message however no longer has to be incorporated, but rather only the "excess" d (that is to say the last message part) is taken into consideration.

A first digital signature for the first message is then formed by the first communication partner in a method step 140, for example by calculating the digital signature by way of the first checksum.

The first message containing the first digital signature is then transmitted to the second communication partner by the first communication partner in a method step 150. In this case, in particular only the first message and the first digital signature are sent, without the first nonce.

An explanation is given below as to how a first nonce is calculated on the basis of the first sub-checksum and taking into consideration the last unmodified message part (that is to say the last message part without the abovementioned padding).

It is generally first of all checked in a method step 160 whether a checksum of a previous message is present. Since the first message is not preceded by any other message (path N2), there is no checksum of a previous message that would have been calculated for example in the case of checking of a digital signature by a communication partner (here for example the first communication partner). If a checksum of a previous message were to be present (path Y2), then this checksum would be attached to the last message part d of the first message (that is to say to the end of the last message part d) in a method step 165. In such a case (checksum present), the checksum of the preceding message may be attached directly to the end of the last message part (attached also being able to be referred to as inserted, appended and the like).

Since however a corresponding checksum of a preceding message is not available for the first message (path N2), an initialization value (for example a random number, 0 bits or another bit pattern) that may have the same length as the first checksum is attached to the last message part d. As an alternative, for example, no initialization value may be attached to the last message part d.

To calculate the (first) nonce, the last message part d has at this time not yet been processed with padding. This may be achieved for example either by trimming the padding bits again or by buffer-storing the unmodified last message part (that is to say without padding).

The calculated (first) nonce may be then jointly used in a key derivation.

Only then is the padding performed for the last message part and a partial checksum is formed for the last message part (possibly including the checksum of the preceding message or of the initialization value) in a method step 170, which partial checksum is formed depending on the preceding partial checksum. This is performed for example by first calling the function SHA256_Update(CTX_K, "0", ...) and then the function SHA256_Final(digest, CTX_K). If the length of the last message part (due to the length of the checksum or of the initialization value) is however greater than the previously determined length of the partial messages, an additional partial checksum also has to be calculated by way of SHA256_Update (this accordingly thereby gives d+1 message parts, wherein the d+1 message part is the last message part and the additional message part is the $d^{th}$ message part). This is explained in more detail for example further below in this exemplary embodiment and in FIG. 3, as is performed in such a case with the additional/excess message part.

In a method step 180, this then gives the first nonce, which may be stored by the (first) communication partner in a method step 190 for internal use (for example for use in a key exchange).

Stated in somewhat simpler and more general terms, the method may be performed in order to calculate the digital signature and the nonce as follows.

Let M1=M| E1 and M2=M| E2 be two messages that match in terms of the first part (M). In this case, M are the message parts up to the last message part d, as has been explained above. The checksums H1=H(M1) and H2=H(M2) may then be calculated as follows:
SHA_Init(CTX)
SHA_Update(CTX, M)
CTX_K=copy(CTX)
SHA_Update(CTX, E1)
SHA_Update(CTX_K, E2)
H1=SHA_Final(CTX)
H2=SHA_Final(CTX_K)

The logic contained in SHA_Update and SHA_Final then implements this exactly as described; in particular splitting the message into partial messages and correctly handling the padding. The context data CTX likewise for example store the excess/additional message part of the message to be hashed that has not yet been taken into consideration.

If the first message containing the first digital signature is then received by the second communication partner, said second communication partner first of all checks the first digital signature. For this purpose, the second communication partner forms a (local) first checksum and uses this to calculate a digital signature that corresponds, in the case of an unchanged first message, to the first digital signature of the first communication partner. The (local) first checksum of the second communication partner therefore corresponds to the first checksum of the first communication partner if the first message has not been falsified. If these signatures/checksums do not match, the message is falsified and the method ends or no cryptographic keys are exchanged. For the exemplary embodiment, it is however assumed that no message has been falsified.

The second communication partner then forms a first message in the same way as the first communication partner. For this second message, in the same way as for the first message, a second checksum is accordingly calculated by the second communication partner, wherein the second message is divided into second message parts (in the same way as for the first message). A second sub-checksum is accordingly also formed by way of the second message parts up to a last message part of the second message parts (in the same way as for the first sub-checksum). In the same way as for the first checksum, the second checksum is also formed on the basis of the second sub-checksum and taking into consideration the last message part.

In the same way as for the first digital signature, the second communication partner accordingly forms a second digital signature for the second message.

In the calculation of a second nonce by the second communication partner in the same way as for the first nonce the second sub-checksum and the last message part of the second message parts of the second message are accordingly taken into consideration by the second communication partner. Since, however, a checksum of a previous message (that is to say the (local) first checksum) is available, the first checksum is attached to the last message part for this calculation and the padding is performed only thereafter. The second nonce may for example be created by again calling the function SHA256_Final(CTX_K, second message, ...) for the second message parts, taking into consideration the first checksum as mentioned above. The resultant second nonce may be stored by the second communication partner for internal use (for example for use in a key exchange).

The second communication partner then transmits the second message containing the second digital signature to the first communication partner.

It is assumed in particular in said method that the partial checksums are formed successively from 0 to d or d−1 or d+1 and an implicit order thus in particular exists. More precisely, the message parts 0 to d−1 are for example taken into consideration for the corresponding sub-checksum of a corresponding message. The message parts 0 to d−1 are then taken into consideration by way of the corresponding sub-checksum and the message part d for the checksum of the corresponding message. The message parts 0 to d−1 are then for example taken into consideration by way of the corresponding sub-checksum, the message part d and possibly the message part d+1 for a corresponding nonce of the corresponding message, wherein the message part d is modified in particular by the initialization value/preceding checksum of a preceding message (and under some circumstances giving a further message part d+1 that then may represent the last message part).

In other words, embodiments of the invention achieves a situation whereby it is possible to dispense with jointly sending the nonces in a key exchange. The number of calls of cryptographic functions is additionally able to be reduced since, by virtue of a clever selection of the arrangement of the data (attaching a checksum of the previous message to the last message part of a (current) message), the sub-checksums for the corresponding checksums and the corresponding nonces of a corresponding message are able to be used. The number of required hash operations that are necessary in a key exchange is accordingly optimized/reduced in comparison with conventional key exchange methods.

The method is advantageous in that the nonces no longer have to be sent as part of the messages in a key exchange, but rather are able to be calculated locally. The number of operations performed in the specific combination with digital signatures is additionally optimized by way of the method. The corresponding sub-checksum is thus able to be used in each case for the digital signature and the corresponding nonces, such that the cryptographic operations for the nonce and the digital signature are significantly reduced overall. The calculation of the digital signature and of the nonce is thereby able to be simplified significantly.

A hash function having a fixed block size (message part length) may for example be used in this case. To this end—as mentioned above—SHA-256 is used in order to achieve the desired result. In detail, SHA-256 for this purpose uses 512-bit blocks (that is to say a message part length of 512 bits), as illustrated in FIG. 2.

Figure 2:
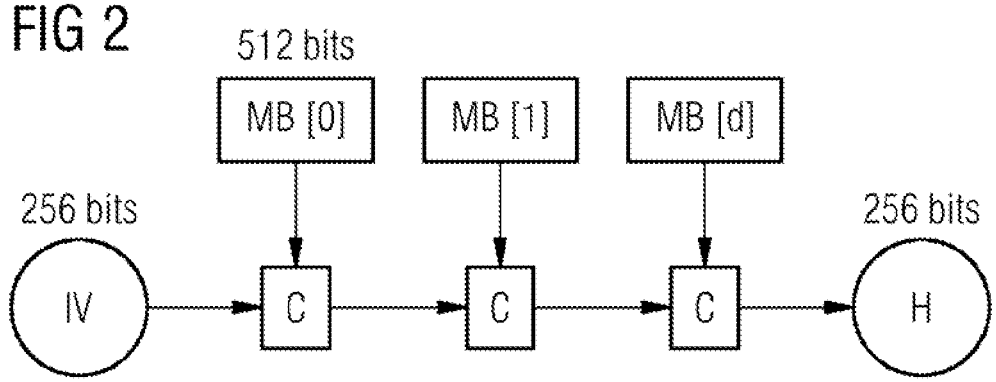
FIG. 2 shows a further exemplary embodiment of the invention.

In detail, FIG. 2 shows, in simplified form, a checksum H being calculated with SHA-256 for a message. The SHA-256 method is initialized with context data and a key—simply illustrated as IV. A message is then split into message parts MB and, for the corresponding message parts MB [0] to MB [d] (as mentioned above, d is the number of message parts), respective sub-checksums C are calculated, giving the checksum H.

If—as already mentioned above—the SHA-256 from OpenSSL is used, the following interface is provided by OpenSSL.

Initialization: SHA256_Init(CTX)
Update: SHA256_Update(CTX, data, datalength), calling the hash operation for each complete 512-bit block takes place internally in the function
Final round: SHA256_Final(digest, CTX), call for the last block In order to reduce the number of calls of cryptographic functions, it is proposed to arrange the data as follows:

$$h_n = \text{hash}(\text{message} \| h_{n-1}) \text{ with } h_0 = 0,$$

wherein h is a checksum of a message and 0 to n is a counter for the messages.

In the calculation, the data for nonces and the digital signature up to the last message part of a respective message may then be treated the same by using or buffer-storing the sub-checksum.

In the case of the digital signature, the corresponding checksum is concluded for example with the last round (that is to say calculation of the sub-checksum for the last message part). In the case of a nonce, the checksum of the preceding message is in particular additionally attached. This may for example lead to an additional round (at least one additional message part thus results for the respective one partial checksum) in the calculation of the checksum or of the partial checksum, since the checksum of the preceding message has a size of 256 bits and the last message part may thus exceed the message part length of 512 bits.

In such a case, this results in d+1 message parts, wherein the corresponding partial checksums are then calculated for the message part d (for example with SHA_Update) and the message part d+1 (for example with SHA_Final). In this case, the message part d may be referred to as excess message part (or additional message part), and d+1 may be referred to as last message part. The last message part d+1 is then—as explained above—likewise brought to the corresponding message part length by way of padding and then—as explained above—the corresponding nonce is calculated for the respective message.

In the case of OpenSSL, a corresponding message would be hashed up to the penultimate message part d−1 (by calling SHA256_Update(CTX, data, datalength)). Before calling the function SHA256_Final, the context data (that is to say containing the sub-checksum) is copied into a new structure CTX_K in order to buffer-store the sub-checksum.

In order to calculate the corresponding checksum for the signature by way of the data, SHA256_Final(digest, CTX) is called, wherein digest is the checksum.

To calculate the nonce, SHA256_Update(CTX_K, $h_n$−1, len($h_n$−1)) is called, followed by SHA256_Final(digest1, CTX_K), wherein digest1 is the nonce.

Figure 3:
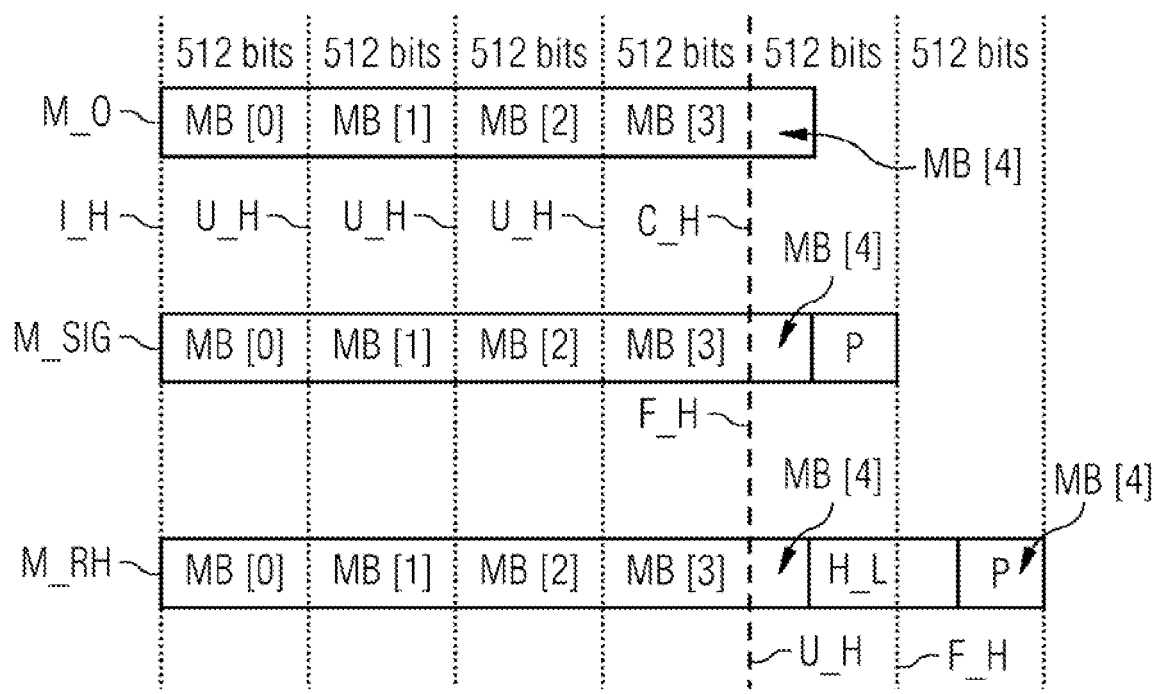
FIG. 3 shows a further exemplary embodiment of the invention.

FIG. 3 shows how the checksum and the nonce from the previous exemplary embodiments may be formed.

A message M_O has a message length m of 2348 bits. In the case of a fixed message part length l of 512 bits, this results in 0 . . . 4 message parts MB[i] (i is the index for selecting a corresponding message part), wherein 4 is the last message part MB [4]. In this case, e=m modulo l results in a remaining message part length e=300.

In order to stay with the already mentioned SHA-256 implementation of OpenSSL, SHA256_Init I_H is first of all called (as explained above) for the initialization. A sub-checksum for the corresponding message parts MB [0 to d−1] is then calculated for each message part up to the last message part as 0 to d−1 or MB [0] to MB [3] in each case by way of SHA256_Update U_H, which in each case (where possible) for example take into consideration the sub-checksum of the previous message part. The corresponding sub-checksums may for example be stored in the context information (or else just called context).

The context or the sub-checksum (the sub-checksum comprising the partial checksum for message parts up to the penultimate message part d−1 and optionally the context data of the SHA method) is then buffer-stored C_H and may for example—as in the preceding exemplary embodiments—be called CTX_K. As explained in the preceding exemplary embodiments, there are at this time two sub-checksums, the sub-checksum CTX and the copied sub-checksum CTX_K. This is in particular an implementation detail that is due to the specific implementation of the SHA method by OpenSSL.

Other methods/implementation variants, in which the interfaces provided by OpenSSL are adjusted, are also conceivable. By way of example, the sub-checksum or the context (data) CTX might not be modified by the SHA-Final call, and a separate input/output variable may be used instead. It is thus not absolutely necessary to apply a copy, but rather it only needs to be ensured in particular that the sub-checksum for the calculation of the nonce and the calculation of the digital signature is unchanged or identical.

In order to form the message M_SIG containing the digital signature, the last message part MB[4] is filled to the message part length l by way of padding bits P. SHA256_Final F_H is then called with CTX or the sub-checksum in order to calculate the last partial checksum for the last message part and therefore the corresponding checksum for the message M_O. As explained in the preceding exemplary embodiments, the digital signature is then formed by way of the checksum. The digitally signed message M_SIG is then formed from the digital signature and the message M_O.

To calculate the nonce M_RH, the checksum H_L of the preceding message is first of all attached to the last message part MB[4] (that is to say to the end of the message part). The message part d or MB[4] thus forms an excess message part since the checksum has a message length of 256 bits, and the permissible message part length 512 for the message part d or MB[4] is thus exceeded.

This gives rise to a fifth message part MB [5] or a message part d+1 that forms the last message part. This initially has a length of 44 bits, which are filled to 512 bits or to the corresponding message part length of 512 bits by way of padding bits P.

In order then to calculate the nonce, a corresponding partial checksum is calculated for the excess message part d or MB[4] by way of SHA256_Update using the copy of the sub-checksum or CTX_K. The last partial checksum is formed for the then last message part d+1 or MB[5], by then using SHA256_Final using the partial checksum of the excess message part. In practice, this takes place by transmitting CTX_K in the SHA256_Final call, wherein CTX_K has been modified for the excess message part by the SHA256_Update call or the previous partial checksums are jointly taken into consideration in this way. In other words, the SHA256_Final call in this case then delivers the nonce.

Figure 4:
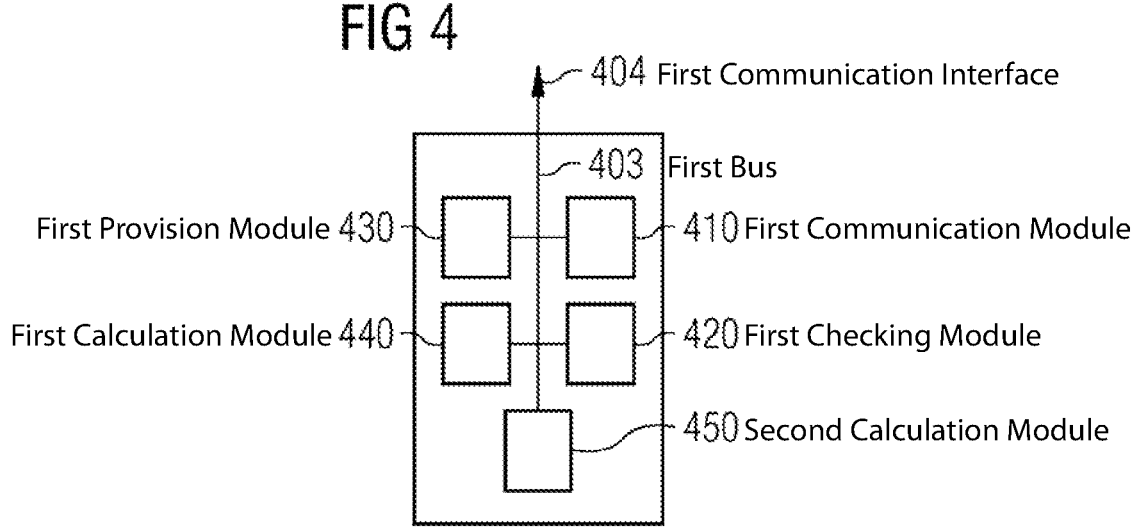
FIG. 4 shows a further exemplary embodiment of the invention.

FIG. 4 shows a further exemplary embodiment of the invention in the form of a device for exchanging messages.

The device comprises a first communication module 410, a first checking module 420, a first provision module 430, a first calculation module 440, a second calculation module 450, and an optional first communication interface 404 that are connected to one another in terms of communication via a first bus 403.

The device may additionally for example also comprise another or a plurality of further components, such as for example a processor, a storage unit, an input device, in particular a computer keyboard or a computer mouse, and a display device (for example a monitor). The processor may for example comprise a plurality of further processors, wherein for example the further processors each form one or more of the modules. As an alternative, the processor in particular forms all of the modules of the exemplary embodiment. The further component or components may for example likewise be connected to one another in terms of communication via the first bus 403.

The processor may be for example an ASIC that has been produced in an application-specific manner for the functions of a respective module or all of the modules of the exemplary embodiment (and/or further exemplary embodiments), wherein the program component or the program commands are implemented in particular in the form of integrated circuits. The processor may also be for example an FPGA that is configured in particular by way of the program commands such that the FPGA implements the functions of a respective module or all of the modules of the exemplary embodiment (and/or further exemplary embodiments).

The first communication module 410 is configured so as to receive a first message containing a first digital signature from a communication partner (for example a first communication partner or a second communication partner).

The first communication module 410 may for example be implemented or formed by way of the processor, the storage unit and a first program component, wherein the processor is configured, for example by way of executing program commands of the first program component, or the processor is configured by way of the program commands, such that the first message and the first digital signature are received.

The first checking module 420 is configured so as to check the first digital signature, wherein a first checksum is calculated in order to check the first digital signature.

The first checking module 420 may for example be implemented or formed by way of the processor, the storage unit and a second program component, wherein the processor is configured, for example by way of executing program commands of the second program component, or the processor is configured by way of the program commands, such that the first digital signature is checked.

The first provision module 430 is configured so as to provide a second checksum for a second message, wherein
  the second message is divided into second message parts,
  a second sub-checksum is formed by way of the second message parts up to a last message part of the second message parts,
  the second checksum is formed on the basis of the second sub-checksum and taking into consideration the last message part.

The first provision module 430 may for example be implemented or formed by way of the processor, the storage unit and a third program component, wherein the processor is configured, for example by way of executing program commands of the third program component, or the processor is configured by way of the program commands, such that the second checksum is provided.

The first calculation module 440 is configured so as to form a second digital signature for the second message on the basis of the second checksum.

The first calculation module 440 may for example be implemented or formed by way of the processor, the storage unit and a fourth program component, wherein the processor is configured, for example by way of executing program commands of the fourth program component, or the processor is configured by way of the program commands, such that the second digital signature is calculated.

The second calculation module 450 is configured so as to calculate a second nonce on the basis of the second sub-checksum and taking into consideration the last message part, wherein
  the first checksum is attached to the last message part for this calculation,
  the first communication module transmits the second message. In this case, the second message is in particular transmitted to the communication partner.

The second calculation module 450 may for example be implemented or formed by way of the processor, the storage unit and a fifth program component, wherein the processor is configured, for example by way of executing program commands of the fifth program component, or the processor is configured by way of the program commands, such that the second nonce is calculated.

In further embodiments of the device, the device comprises at least one further module or a plurality of further modules for performing the method according to embodiments of the invention.

By way of example, a first communication partner and/or a second communication partner may have the device. The communication partner sending the first message may then comprise a/the device that implements method steps aa) to ad) in terms of hardware.

The program commands of the respective modules may be executed in this case for example by way of the processor itself and/or by way of a boot component, for example a loader or a configuration component.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for exchanging messages, the method comprising:
   a) receiving a first message containing a first digital signature of a first communication partner by a second communication partner;
   b) checking the first digital signature by the second communication partner, wherein a first checksum is calculated for the first message in order to check the first digital signature;
   c) providing a second checksum for a second message by the second communication partner, wherein
      the second message is divided into second message parts,
      a second sub-checksum is formed by way of the second message parts up to a last message part of the second message parts,
      the second checksum is formed on the basis of the second sub-checksum and taking into consideration the last message part;
   d) forming a second digital signature for the second message on the basis of the second checksum by the second communication partner;
   e) calculating a second nonce on the basis of the second sub-checksum and taking into consideration the last message part by the second communication partner, wherein
      the first checksum is attached to the last message part for the calculation of the second nonce;
   f) transmitting the second message containing the second digital signature to the first communication partner by the second communication partner.

2. The method as claimed in claim 1, wherein, prior to receiving the first message, the following method steps are executed by the first communication partner:
   aa) calculating the first checksum for the first message, wherein
      the first message is divided into first message parts,
      a first sub-checksum is formed by way of the first message parts up to a last message part of the first message parts,
      the first checksum is formed on the basis of the first sub-checksum and taking into consideration the last message part of the first message parts;
   ab) forming the first digital signature for the first message on the basis of the first checksum;
   ac) calculating a first nonce on the basis of the first sub-checksum and taking into consideration the last message part of the first message parts, wherein
      an initialization value is attached to the last message part of the first message parts for the calculation of the first nonce;
   ad) transmitting the first message containing the first digital signature to the second communication partner.

3. The method as claimed in claim 1, wherein
   a fixed message part length is predefined for the second message parts and
   the last message part gives a remaining message part length that is less than or equal to the message part length.

4. The method as claimed in claim 3, wherein the message part length is an integer multiple of 64 bits.

5. The method as claimed in claim 1, wherein key material for a cryptographic method is exchanged or established between the communication partners by way of the messages.

6. The method as claimed in claim 1, wherein the first checksum and/or the second checksum is a cryptographic hash.

7. The method as claimed in claim 1, wherein the first checksum and/or the second checksum are calculated by way of a cryptographic hash function.

8. The method as claimed in claim 1, wherein
   respective further digital signatures and further nonces are calculated by the first communication partner and/or the second communication partner in line with method steps a)-e) for further messages, and the further messages, containing their respective further digital signatures, are transmitted to a corresponding communication partner,
   further sub-checksums are in particular in each case calculated,
   the checksum of the previous message is in particular taken into consideration in the calculation of the respective further nonce.

9. A device for exchanging messages, comprising:
   a first communication module for receiving a first message containing a first digital signature;
   a first checking module for checking the first digital signature, wherein a first checksum is calculated in order to check the first digital signature;
   a first provision module for providing a second checksum for a second message, wherein
   the second message is divided into second message parts,
   a second sub-checksum is formed by way of the second message parts up to a last message part of the second message parts,
   the second checksum is formed on the basis of the second sub-checksum and taking into consideration the last message part;
   a first calculation module for forming a second digital signature for the second message on the basis of the second checksum;
   a second calculation module for calculating a second nonce on the basis of the second sub-checksum and taking into consideration the last message part, wherein
   the first checksum is attached to the last message part for the calculation of the second nonce,
   the first communication module transmits the second message.

10. A computer program product, comprising a computer readable hardware storage device having computer readable program code stored therein, said program code executable by a processor of a computer system to implement a method containing program commands for performing the methods as claimed in claim 1.

11. A computer program product comprising a computer readable hardware storage device having computer readable program code stored therein, said program code executable by a processor of a computer system to implement a method containing program commands for a creation device that is configured, by way of the program commands, so as to implement the device as claimed in claim 9.

12. A provision device comprising the computer program product as claimed in claim 10, wherein the provision device stores and/or provides the computer program product.

13. The method as claimed in claim 3, wherein the message part length is 256 bits.

14. The method as claimed in claim 3, wherein the message part length is 512 bits.

* * * * *